United States Patent
Zhang

(10) Patent No.: US 12,448,364 B2
(45) Date of Patent: Oct. 21, 2025

(54) 2, 4-DIAMINOPYRIMIDINE DERIVATIVE AND APPLICATION THEREOF

(71) Applicant: Shanghai Zheye Biotechnology Co., Ltd., Shanghai (CN)

(72) Inventor: Lei Zhang, Zheijang (CN)

(73) Assignee: Shanghai Zheye Biotechnology Co., Ltd., Shanghai (CN)

(*) Notice: Subject to any disclaimer, the term of this patent is extended or adjusted under 35 U.S.C. 154(b) by 1151 days.

(21) Appl. No.: 17/418,550

(22) PCT Filed: Dec. 25, 2019

(86) PCT No.: PCT/CN2019/128245
§ 371 (c)(1),
(2) Date: Feb. 21, 2022

(87) PCT Pub. No.: WO2020/135488
PCT Pub. Date: Jul. 2, 2020

(65) Prior Publication Data
US 2022/0177448 A1    Jun. 9, 2022

(30) Foreign Application Priority Data
Dec. 26, 2018   (CN) .......................... 201811594666.9

(51) Int. Cl.
*C07D 401/14*    (2006.01)
*C07D 405/14*    (2006.01)

(52) U.S. Cl.
CPC ......... *C07D 401/14* (2013.01); *C07D 405/14* (2013.01)

(58) Field of Classification Search
CPC .. C07D 401/14; C07D 405/14; C07D 401/00; C07D 405/00
See application file for complete search history.

(56) References Cited

U.S. PATENT DOCUMENTS

| | | | | |
|---|---|---|---|---|
| 2007/0259904 A1* | 11/2007 | Noronha | ................ | A61P 35/02 544/323 |
| 2016/0214944 A1* | 7/2016 | Mollard | ................ | A61P 43/00 |
| 2017/0247392 A1 | 8/2017 | Dong et al. | | |
| 2018/0338973 A1 | 11/2018 | Wang et al. | | |

FOREIGN PATENT DOCUMENTS

| | | | |
|---|---|---|---|
| CN | 1697830 | 11/2005 | |
| CN | 102336716 | 2/2012 | |
| CN | 104672214 | 6/2015 | |
| CN | 105308033 | 2/2016 | |
| EP | 2 970 205 A2 | 1/2016 | |
| JP | 2016-513661 A | 5/2016 | |
| JP | 2017-516825 A | 6/2017 | |
| JP | 2018-532759 A | 11/2018 | |
| WO | WO-03/095448 | 11/2003 | |
| WO | WO-2009/032668 A2 | 3/2009 | |
| WO | WO-2014/151871 A2 | 9/2014 | |
| WO | WO-2015081813 A1 * | 6/2015 | ........... A61K 31/506 |
| WO | WO-2016/033100 | 3/2016 | |
| WO | WO-2020051572 A1 * | 3/2020 | ........... C07D 403/12 |
| WO | WO-2020135488 A1 * | 7/2020 | ............. A61P 35/00 |

OTHER PUBLICATIONS

Boothroyd, S.; et al. "Why Do Some Molecules Form Hydrates or Solvates?" 2018, Cryst. Growth Des., vol. 18, pp. 1903-1908. (Year: 2018).*
English language machine translation of WO 2020135488 A1; translated Feb. 18, 2025. (Year: 2020).*
English language machine translation of WO 2015081813 A1; translated Jul. 16, 2025. (Year: 2015).*
International Search Report for PCT/CN2019/128245 issued Mar. 30, 2021; 12 pages.
Notification of Reasons for Refusal issued in connection with JP Appl. Ser. No. 2021-538419 dated Aug. 30, 2022 (7 pages).
Extended European Search Report issued in connection with EP Appl. Ser. No. 19902320.1 dated Aug. 11, 2022 (7 pages).

* cited by examiner

*Primary Examiner* — Eric Olson
*Assistant Examiner* — Benjamin M Brandsen
(74) *Attorney, Agent, or Firm* — FOLEY & LARDNER LLP

(57) ABSTRACT

The present invention relates to a 2,4-diaminopyrimidine derivative, pharmaceutically acceptable salts thereof, hydrates, solvates or stereoisomers, and a preparation method thereof and an application of the compound used separately or in combination with other drugs in treating diseases having ALK2 kinase-mediated pathological features Formula (I)

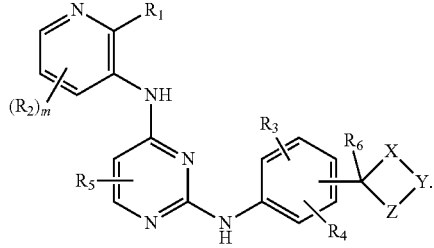

7 Claims, No Drawings

2,4-DIAMINOPYRIMIDINE DERIVATIVE AND APPLICATION THEREOF

CROSS-REFERENCE TO RELATED PATENT APPLICATIONS

This application is a U.S. National Phase Application under 35 U.S.C. § 371 of International Application No. PCT/CN2019/128245, filed Dec. 25, 2019, which claims the benefit of priority to CN 201811594666.9, filed on Dec. 26, 2018, both of which are incorporated herein by reference in their entirety.

TECHNICAL FIELD

The present invention relates to a 2,4-diaminopyrimidine derivative, pharmaceutically acceptable salts, hydrates, solvates or stereoisomers thereof, and a preparation method thereof and an application of the compound used separately or in combination with other drugs in treating diseases having ALK2 kinase-mediated pathological features.

TECHNICAL BACKGROUND

The iron balance of the whole body is maintained by coordinating and regulating duodenal iron absorption, iron recycling of senescent red blood cells in macrophages, and mobilization of iron stored in the liver (Ganz T., Physiol Rev. 2013; 93(4):1721-1741). A key coordinator in this process is a small peptide hormone mainly synthesized in liver cells-hepcidin (Krause A. Etc., FEBS Lett. 2000; 480(2-3):147-150; Pigeon C. Etc., J Biol Chem. 2001; 276(11): 7811-7819; Park C H. Etc., J Biol Chem. 2001; 276(11): 7806-7810). Hepcidin reduces duodenal iron absorption and iron output from monocytes/macrophages by binding to and inducing the internalization and degradation of ferroportin (FPN1) (Hentze M W Etc., Cell. 2010; 142(1): 24-38; Nemeth E. Etc., Science. 2004; 306(5704): 2090-2093; Theurl I. Etc., Blood. 2009; 113(21):5277-5286). Therefore, elevated serum hepcidin levels enhance iron storage in the reticuloendothelial system and lead to a decrease in available iron and the production of iron-deficient red blood cells. Abnormally elevated expression of hepcidin can cause severe functional iron deficiency anemia in the human body, and is the core of the pathophysiology of anemia of chronic disease (ACD) (Weiss G. Etc., N Engl J Med. 2005; 352(10): 1011-1023). The transcription of hepcidin in the liver is mainly affected by several factors, comprising iron storage in the body, iron demand for red blood cell production, hypoxia and inflammation. Bone morphogenetic proteins (BMPs) play an important role in mediating these factors and driving the induction of hepcidin transcription through activation of BMP receptor (BMPR)-SMAD signaling (Wang R H. Etc., Cell Metab. 2005; 2(6):399-409; Andriopoulos B Jr. Etc., Nat Genet. 2009; 41(4):482-487; Meynard D. Et al., Nat Genet. 2009; 41(4): 478-481; Zhao N. Etc., J Clin Invest. 2013; 123(6): 2337-2343). BMPR activin receptor-like kinase 2 (ALK2) and ALK3 have shown an important role in this process. The liver-specific deletion of ALK2 or ALK3 blocks the induction of hepcidin production downstream of BMP ligand binding and leads to iron overload in mice (SteinbickerAU. Etc., Blood. 2011; 118(15): 4224-4230).

BMP ligands interact with bone morphogenetic protein receptors (BMPRs), and BNPRs belong to the serine/threonine kinase receptors of the TGF-β superfamily. Anemia caused by chronic infection, inflammation, and malignant tumors is usually called anemia of chronic disease. In these patients, BMP signal induces the liver expression of hepcidin through two BMP type I receptors, ALK2 and ALK3. Hepcidin degrades iron output, ferroportin reduces blood iron levels, leading to an increase of iron storage in macrophages and other cells, and making it unusable for hemoglobin and red blood cell functions. Increasing iron intake cannot reverse anemia of chronic disease (ACD) because the iron intake due to the activation of the BMP pathway and high plasma hepcidin levels is only stored. Blocking BMP signaling is a potential therapy for the treatment of anemia of chronic diseases.

The BMP signaling pathway also plays an important role in the growth and deterioration of tumor cells, especially breast cancer, prostate cancer, and other tumors that are prone to bone metastasis (Lin Ye. Etc., Front Biosci. 2011 (16): 865-897). The expression of BMPs and BMPRs in metastatic breast cancer is higher than that in non-metastasis breast cancer, and is also highly expressed in prostate cancer with bone metastasis. These results indicate that BMP inhibitors may prevent bone metastasis.

SUMMARY

The aim of the present invention is to provide a compound represented by formula (I) or pharmaceutically acceptable salts, hydrates, solvates or stereoisomers thereof,

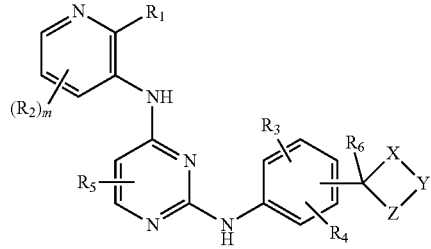

formula (I)

wherein,

X, Y and Z are each independently selected from the group consisting of —O—, —NR$_7$—, —S—, —CO—, —SO$_2$—, —SO—, and —(CR$_7$R$_8$)$_p$—;

R$_1$ is selected from the group consisting of —H, halogen, —OH, —CN, —CF$_3$, —CHF$_2$, —CH$_2$F, —OCF$_3$, —(CH$_2$)$_q$NR$_9$R$_{10}$—, —CONR$_9$R$_{10}$, —NO$_2$, —C$_{1-6}$ alkyl, —C$_{2-6}$ alkenyl, —C$_{2-6}$ alkynyl, heteroalkyl, 3-8 membered cycloalkyl, saturated or unsaturated heterocyclyl, aryl and heteroaryl, wherein the alkyl, alkenyl, alkynyl, heteroalkyl, cycloalkyl, heterocyclyl, aryl or heteroaryl can be optionally substituted;

R$_2$ is selected from the group consisting of —H, halogen, —OH, —CN, —CF$_3$, —CHF$_2$, —CH$_2$F, —OCF$_3$, —(CH$_2$)$_q$NR$_9$R$_{10}$—, —CONR$_9$R$_{10}$, —NO$_2$, —C$_{1-6}$ alkyl, —C$_{2-6}$ alkenyl, —C$_{2-6}$ alkynyl, heteroalkyl, —OR$_9$, —COR$_9$, —COOR$_9$ and —NR$_9$COR$_{10}$, wherein the alkyl, alkenyl, alkynyl or heteroalkyl can be optionally substituted;

R$_3$ and R$_4$ are each independently selected from the group consisting of —H, halogen, —OH, —CN, —CF$_3$, —CHF$_2$, —CH$_2$F, —OCF$_3$, —(CH$_2$)$_q$NR$_9$R$_{10}$—, —CONR$_9$R$_{10}$, —NO$_2$, —C$_{1-6}$ alkyl, —C$_{2-6}$ alkenyl, —C$_{2-6}$ alkynyl, heteroalkyl, —OR$_9$, —COR$_9$, —COOR$_9$, —SO$_2$R$_9$, —NR$_9$COR$_{10}$, —NR$_9$CONR$_{10}$R$_{11}$, —NR$_9$CO$_2$R$_{10}$, —NR$_9$SO$_2$NR$_{10}$R$_{11}$ and —NR$_9$SO$_2$R$_{10}$, wherein the alkyl, alkenyl, alkynyl or heteroalkyl can be optionally substituted;

R$_5$ is selected from the group consisting of —H, halogen, —OH, —CN, —CF$_3$, —NO$_2$, —C$_{1-6}$ alkyl, —C$_{2-6}$ alkenyl, —C$_{2-6}$ alkynyl and heteroalkyl, wherein the alkyl, alkenyl, alkynyl or heteroalkyl can be optionally substituted;

R$_6$ is selected from the group consisting of —H, halogen, —OH, —CN, —CF$_3$, —C$_{1-6}$ alkyl, —C$_{2-6}$ alkenyl, —C$_{2-6}$ alkynyl, heteroalkyl and —OR$_9$;

R$_7$ and R$_8$ are each independently selected from the group consisting of —H, halogen, —C$_{1-6}$ alkyl, heteroalkyl, —C$_{2-6}$ alkenyl, —C$_{2-6}$ alkynyl, saturated or unsaturated heterocyclyl, oxo, 3-8 membered cycloalkyl, —COR$_9$, —COOR$_9$ and —CONR$_9$R$_{10}$; wherein the alkyl, alkenyl, alkynyl, heterocyclyl or cycloalkyl can be optionally substituted;

R$_9$, R$_{10}$ and R$_{11}$ are each independently selected from the group consisting of —H, heteroalkyl, —C$_{1-6}$ alkyl, —C$_{2-6}$ alkenyl, —C$_{2-6}$ alkynyl, 3-8 membered cycloalkyl, saturated or unsaturated heterocyclyl, aryl and heteroaryl; wherein (R$_9$ and R$_{10}$) and/or (R$_{10}$ and R$_{11}$) together with the nitrogen atom to which they are connected form a saturated or unsaturated heterocyclic ring which can be substituted with at least one R$_{12}$;

each R$_{12}$ is independently selected from the group consisting of —H, halogen, —C$_{1-6}$ alkyl and oxo;

m is 0, 1, 2 or 3;

p is 1, 2 or 3;

q is 0, 1, 2 or 3.

In another aspect, the present invention provides a compound of formula (II),

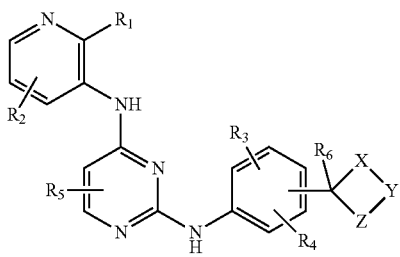

formula (II)

wherein,

X, Y and Z are each independently selected from the group consisting of —O—, —NR$_7$—, —S—, —CO—, —SO$_2$—, —SO— and —(CR$_7$R$_8$)$_p$—;

R$_1$ is selected from the group consisting of aryl and heteroaryl which can be optionally substituted;

R$_2$ is selected from the group consisting of —H, halogen, —OH, —CN, —CF$_3$, —CHF$_2$, —CH$_2$F, —OCF$_3$, —(CH$_2$)$_q$NR$_9$R$_{10}$—, —CONR$_9$R$_{10}$, —NO$_2$, —C$_{1-6}$ alkyl, —C$_{2-6}$ alkenyl, —C$_{2-6}$ alkynyl, heteroalkyl, —OR$_9$, —COR$_9$, —COOR$_9$ and —NR$_9$COR$_{10}$, wherein the alkyl, alkenyl, alkynyl or heteroalkyl can be optionally substituted;

R$_3$ and R$_4$ are independently selected from the group consisting of —H, halogen, —OH, —CN, —CF$_3$, —CHF$_2$, —CH$_2$F, —OCF$_3$, —(CH$_2$)$_q$NR$_9$R$_{10}$—, —CONR$_9$R$_{10}$, —NO$_2$, —C$_{1-6}$ alkyl, —C$_{2-6}$ alkenyl, —C$_{2-6}$ alkynyl, heteroalkyl, —OR$_9$, —COR$_9$, —COOR$_9$, —SO$_2$R$_9$, —NR$_9$COR$_{10}$, —NR$_9$CONR$_{10}$R$_{11}$, —NR$_9$CO$_2$R$_{10}$, —NR$_9$SO$_2$NR$_{10}$R$_{11}$ and —NR$_9$SO$_2$R$_{10}$, wherein the alkyl, alkenyl, alkynyl or heteroalkyl can be optionally substituted;

R$_7$ and R$_8$ are each independently selected from the group consisting of —H, halogen, —C$_{1-6}$ alkyl, heteroalkyl, —C$_{2-6}$ alkenyl, —C$_{2-6}$ alkynyl, saturated or unsaturated heterocyclyl, oxo, 3-8 membered cycloalkyl, —COR$_9$, —COOR$_9$ and —CONR$_9$R$_{10}$; wherein the alkyl, alkenyl, alkynyl, heterocyclyl or cycloalkyl can be optionally substituted;

R$_5$ is selected from the group consisting of —H, halogen, —OH, —CN, —CF$_3$, —NO$_2$, —C$_{1-6}$ alkyl, —C$_{2-6}$ alkenyl, —C$_{2-6}$ alkynyl and heteroalkyl, wherein the alkyl, alkenyl, alkynyl or heteroalkyl can be optionally substituted;

R$_6$ is selected from the group consisting of —H, halogen, —OH, —CN, —CF$_3$, —C$_{1-6}$ alkyl, —C$_{2-6}$ alkenyl, —C$_{2-6}$ alkynyl, heteroalkyl and —OR$_9$;

R$_9$, R$_{10}$ and R$_{11}$ are each independently selected from the group consisting of —H, heteroalkyl, —C$_{1-6}$ alkyl, —C$_{2-6}$ alkenyl, —C$_{2-6}$ alkynyl, 3-8 membered cycloalkyl, saturated or unsaturated heterocyclyl, aryl and heteroaryl; wherein (R$_9$ and R$_{10}$) and/or (R$_{10}$ and R$_{11}$) together with the nitrogen atom to which they are connected form a saturated or unsaturated heterocyclic ring which can be substituted with at least one R$_{12}$;

each R$_{12}$ is independently selected from the group consisting of —H, halogen, —C$_{1-6}$ alkyl and oxo;

p is 1, 2 or 3;

q is 0, 1, 2 or 3.

In yet another aspect, the present invention provides a compound of formula (III),

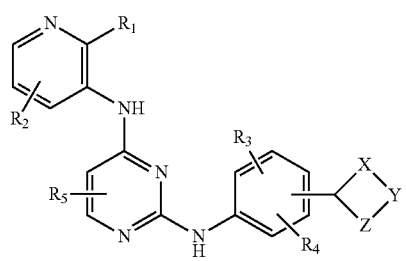

formula (III)

wherein,

X, Y and Z are each independently selected from the group consisting of —O—, —NR$_7$—, —S—, —CO—, —SO$_2$—, —SO— and —(CR$_7$R$_8$)$_p$—;

R$_1$ is selected from the group consisting of heteroaryls which can be optionally substituted;

R$_2$ is selected from the group consisting of —H, halogen, and —C$_{1-6}$ alkyl;

R$_3$ and R$_4$ are each independently selected from the group consisting of —H, halogen, —OH, —CN, —CF$_3$, —CHF$_2$, —CH$_2$F, —OCF$_3$, —(CH$_2$)$_q$NR$_9$R$_{10}$—, —CONR$_9$R$_{10}$, —NO$_2$, —C$_{1-6}$ alkyl, —C$_{2-6}$ alkynyl, heteroalkyl, —OR$_9$, —COR$_9$, —COOR$_9$, —SO$_2$R$_9$, —NR$_9$COR$_{10}$, —NR$_9$CONR$_{10}$R$_{11}$, —NR$_9$CO$_2$R$_{10}$, —NR$_9$SO$_2$NR$_{10}$R$_{11}$ and —NR$_9$SO$_2$R$_{10}$, wherein the alkyl, alkenyl, alkynyl or heteroalkyl can be optionally substituted;

R$_5$ is selected from the group consisting of —H, halogen, —OH, —CN, —CF$_3$, —NO$_2$, —C$_{1-6}$ alkyl, —C$_{2-6}$ alkenyl, —$C_{2-6}$ alkynyl and heteroalkyl, wherein the alkyl, alkenyl, alkynyl or heteroalkyl can be optionally substituted;

$R_7$ and $R_8$ are each independently selected from the group consisting of —H, halogen, —$C_{1-6}$ alkyl, heteroalkyl, —$C_{2-6}$ alkenyl, —$C_{2-6}$ alkynyl, saturated or unsaturated heterocyclyl, oxo, 3-8 membered cycloalkyl, —$COR_9$, $COOR_9$ and —$CONR_9R_{10}$; wherein the alkyl, alkenyl, alkynyl, heterocyclyl or cycloalkyl can be optionally substituted;

$R_9$, $R_{10}$ and $R_{11}$ are each independently selected from the group consisting of —H, heteroalkyl, —$C_{1-6}$ alkyl, —$C_{2-6}$ alkenyl, —$C_{2-6}$ alkynyl, 3-8 membered cycloalkyl, saturated or unsaturated heterocyclyl, aryl and heteroaryl; wherein ($R_9$ and $R_{10}$) and/or ($R_{10}$ and $R_{11}$) together with the nitrogen atom to which they are connected form a saturated or unsaturated heterocyclic ring which can be substituted with at least one $R_{12}$;

each $R_{12}$ is independently selected from the group consisting of —H, halogen, —$C_{1-6}$ alkyl and oxo;

p is 1, 2 or 3;

q is 0, 1, 2 or 3.

In a further embodiment, the present invention provides a compound of formula (III), pharmaceutically acceptable salts, hydrates, solvates or stereoisomers thereof, wherein:

X, Y and Z are each independently selected from the group consisting of —O—, —$NR_7$—, —S—, —CO—, —$SO_2$—, —SO— and —$(CR_7R_8)_p$—;

$R_1$ is selected from the group consisting of pyridyls which can be optionally substituted;

$R_2$ is selected from the group consisting of —H, halogen, and —$C_{1-6}$ alkyl;

$R_3$ and $R_4$ are each independently selected from the group consisting of —H, halogen, —$C_{1-6}$ alkyl and heteroalkyl, wherein the alkyl or heteroalkyl can be substituted with substituents selected from the group consisting of —H, halogen, —$C_{1-4}$ alkyl and oxo;

$R_5$ is selected from the group consisting of —H, halogen, —CN, —$C_{1-6}$ alkyl and —$C_{1-6}$ alkoxy;

$R_7$ and $R_8$ are each independently selected from the group consisting of —H, halogen, acetyl, and —$C_{1-6}$ alkyl; wherein the alkyl can be substituted with substituents selected from the group consisting of —H, halogen and —$C_{1-4}$ alkyl;

p is 1 or 2.

In a further embodiment, the present invention provides a compound of formula (III), pharmaceutically acceptable salts, hydrates, solvates or stereoisomers thereof, wherein:

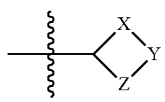

is selected from the group consisting of

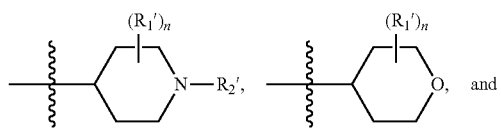

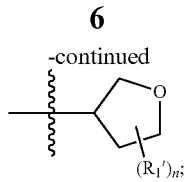

wherein each $R_1'$ is independently selected from the group consisting of —H, —$C_{1-6}$ alkyl, —$C_{1-6}$ alkoxy, —$C_{2-6}$ alkenyl, —$C_{2-6}$ alkynyl and oxo; $R_2'$ is selected from the group consisting of —H, —$C_{1-6}$ alkyl, —$C_{2-6}$ alkenyl, —$C_{2-6}$ alkynyl and —CO—$C_{1-6}$ alkyl; n is selected from 0, 1, 2, 3 or 4;

$R_1$ is

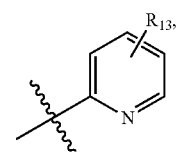

wherein $R_{13}$ is selected from the group consisting of —H, halogen, —OH, —CN, —$CF_3$, —$CHF_2$, —$CH_2F$, —$OCF_3$, —$NO_2$, —$NH_2$, —$C_{1-6}$ alkyl, —$C_{2-6}$ alkenyl, —$C_{2-6}$ alkynyl and heteroalkyl;

$R_2$ is selected from the group consisting of —H, halogen and —$C_{1-6}$ alkyl;

$R_3$ and $R_4$ are each independently selected from the group consisting of —H, halogen, —$C_{1-6}$ alkyl and —$C_{1-6}$ alkoxy, wherein the alkyl or alkoxy can be substituted with substituents selected from the group consisting of —H, halogen, $C_{1-4}$ alkyl and oxo;

$R_5$ is selected from the group consisting of —H, halogen, —CN, —$C_{1-6}$ alkyl and —$C_{1-6}$ alkoxy.

In a further embodiment, the present invention provides a compound of formula (III), pharmaceutically acceptable salts, hydrates, solvates or stereoisomers thereof, wherein:

is selected from the group consisting of

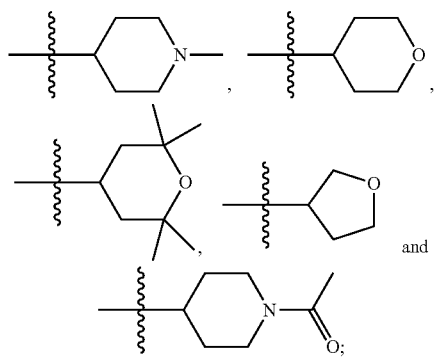

$R_1$ is

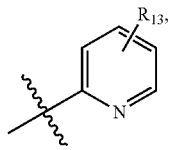

wherein $R_{13}$ is selected from the group consisting of —H, halogen and —$C_{1-6}$ alkyl;

$R_2$ is selected from the group consisting of —H and —$C_{1-6}$ alkyl;

$R_3$ and $R_4$ are each independently selected from the group consisting of —H, halogen, —$C_{1-4}$ alkyl and —$C_{1-4}$ alkoxy;

$R_5$ is selected from the group consisting of —H, halogen, —CN, —$C_{1-4}$ alkyl and —$C_{1-4}$ alkoxy.

The present invention relates to typical compounds of formula (I)-formula (III) as shown below, but is not limited to the following compounds:

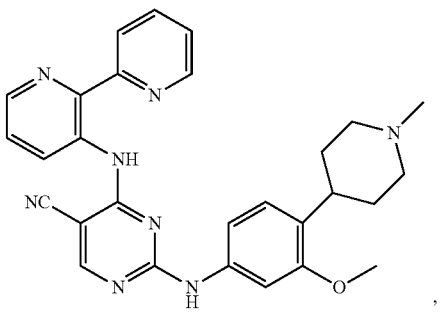

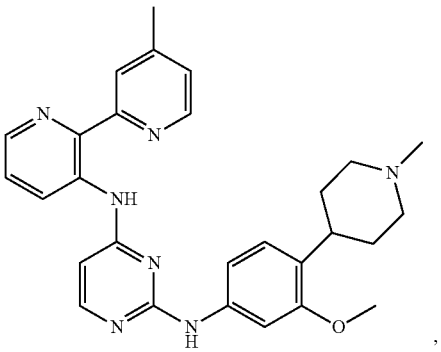

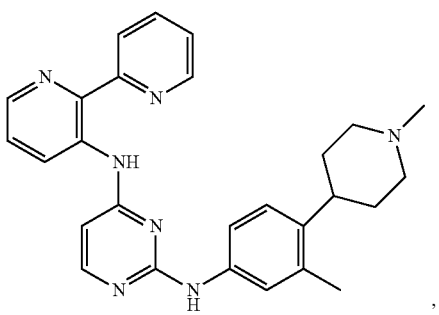

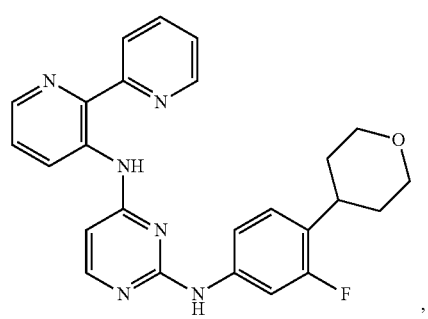

-continued

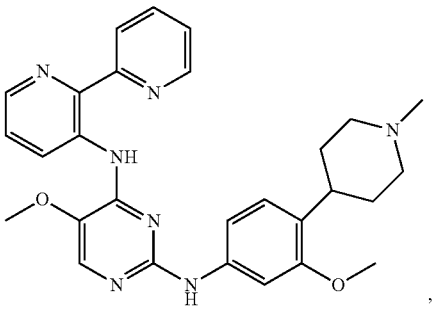

-continued

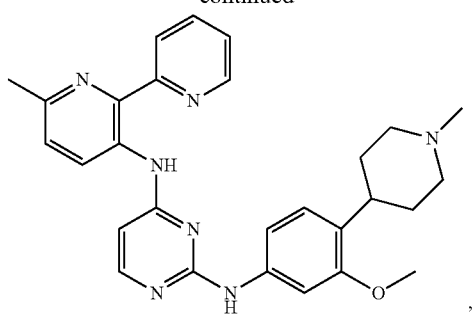

,

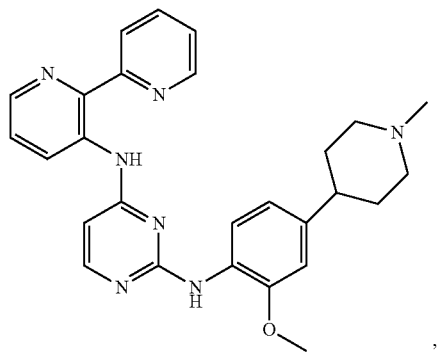

,

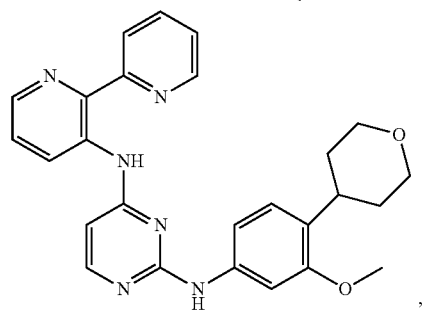

,

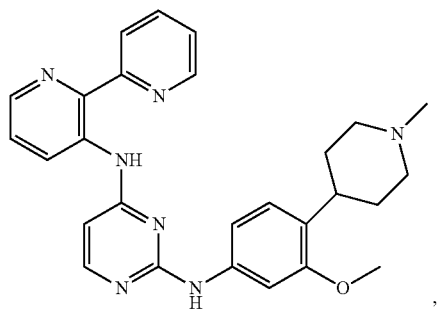

,

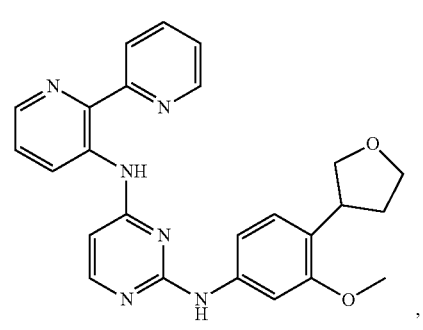

,

-continued

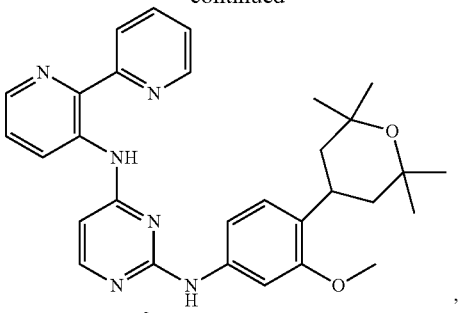

,

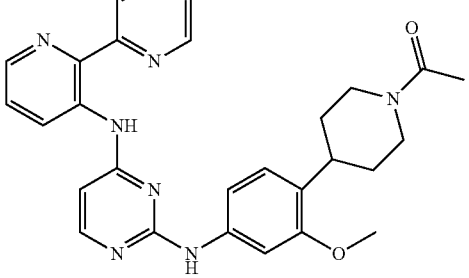

.

Definitions

As used above and elsewhere in this specification, the following terms and abbreviations have the meanings defined below. All technical and scientific terms used in this specification, if they are not defined, have meanings commonly understood by those skilled in the art.

| Abbreviations | Meanings |
| --- | --- |
| ALK2 | Activin receptor-like kinase 2 |
| Hepcidin | Hepcidin |
| FPN1 | Ferroportin |
| ACD | Anemia of Chronic Disease |
| BMPs | Bone morphogenetic protein |
| BMPR | Bone morphogenetic protein receptor |
| TGF-β | Transforming growth factor-beta |
| TLC | Thin-layer chromatography |
| $R_f$ | Retardation factor |
| n-BuOH | N-butanol |
| DCM | Dichloromethane |
| TFA | Trifluoroacetic acid |
| EA | Ethyl acetate |
| ADP | Adenosine Diphosphate |
| ATP | Adenosine Triphosphate |
| Ser/Thr | Serine/Threonine |

The term "halogen" refers to —F, —Cl, —Br, and —I herein.

Herein, the term "alkyl" refers to an alkyl group that does not contain heteroatoms.

Therefore, the term comprises straight chain alkyl groups such as methyl, ethyl, propyl, butyl, pentyl, hexyl, heptyl, octyl, nonyl, decyl, undecyl, dodecyl and the like. The term also comprises branched chain isomers of branched chain alkyl groups, comprising but is not limited to, for example, the following groups: —CH(CH$_3$)$_2$, —CH(CH$_3$)(CH$_2$CH$_3$), —CH(CH$_2$CH$_3$)$_2$, —C(CH$_3$)$_3$, —C(CH$_2$CH$_3$)$_3$, —CH$_2$CH(CH$_3$)$_2$, —CH$_2$CH(CH$_3$)(CH$_2$CH$_3$), —CH$_2$CH(CH$_2$CH$_3$)$_2$, —CH$_2$C(CH$_3$)$_3$, —CH$_2$C(CH$_2$CH$_3$)$_3$—, —CH(CH$_3$)—CH(CH$_3$)(CH$_2$CH$_3$), —CH$_2$CH$_2$CH(CH$_3$)$_2$, —CH$_2$CH$_2$CH(CH$_3$)(CH$_2$CH$_3$), —CH$_2$CH$_2$CH(CH$_2$CH$_3$)$_2$, —CH$_2$CH$_2$C (CH₃)₃, —CH₂CH₂C(CH₂CH₃)₃, —CH(CH₃)CH₂CH (CH₃)₂, —CH(CH₃)CH(CH₃)CH(CH₃)₂, —CH(CH₂CH₃) CH(CH₃)CH(CH₃)(CH₂CH₃), etc. The term alkyl therefore comprises primary, secondary and tertiary alkyl groups.

Herein, the term "alkenyl" refers to an alkyl group as defined above comprising at least one point of unsaturation, i.e. wherein two adjacent carbon atoms are connected by a double bond, wherein the alkyl group is as defined herein.

Herein, the term "alkynyl" refers to an alkyl group in which two adjacent carbon atoms are connected by a triple bond, wherein the alkyl group is as defined herein.

Herein, the term "heteroalkyl" refers to an alkyl group that comprises at least one heteroatom.

Herein, the term "cycloalkyl" refers to mono- or polycyclic carbon cyclic alkyl substituents, comprising cycloalkyl, alkenyl and alkynyl. Cycloalkyl can be monocyclic or polycyclic (for example, containing fused, bridged, and/or spiro ring systems), in which the carbon atoms are located inside or outside the ring system. The cycloalkyl, as a whole, can have 3-14 ring atoms (for example, 3-8 carbon atoms in the case of a monocyclic cycloalkyl, and 7-14 carbon atoms in the case of a polycyclic cycloalkyl). Any suitable ring position of the cycloalkyl can be covalently linked to the defined chemical structure. Examples of cycloalkyls comprise cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, adamantyl and spiro[4.5]decyl and the homologues and isomers thereof.

The term "heterocyclic" or "heterocycle" or "heterocyclyl" refers to a ring selected from the group consisting of 4-12 membered monocyclic, bicyclic and tricyclic saturated and partially unsaturated rings, comprising at least one carbon atom in addition to 1, 2, 3, or 4 heteroatoms selected from oxygen, sulfur, and nitrogen. "Heterocycle" also refers to a 5-7 membered heterocycle that is fused with a 5-, 6- and/or 7-membered cycloalkyl, carbocyclic aromatic ring or heterocyclic aromatic ring and contains at least one heteroatom selected from N, O and S, provided that the point of attachment is on the heterocycle when the heterocycle is fused with a carbocyclic aromatic or heteroaromatic ring, and when the heterocycle is fused with a cycloalkyl, the point of attachment can be on the cycloalkyl or heterocycle.

"Heterocycle" also refers to an aliphatic spiro ring comprising at least one heteroatom selected from N, O, and S, provided that the point of attachment is on the heterocycle. The ring can be saturated or comprises at least one double bond (i.e., partially unsaturated). The heterocycle can be substituted with oxo. The point of attachment can be a carbon atom or a heteroatom in the heterocycle. Heterocycles are not heteroaryls as defined herein.

Examples of heterocycles comprise, but are not limited to (numbering from the preferred attachment position 1) 1-pyrrolidinyl, 2-pyrrolidinyl, 2,4-imidazolidinyl, 2,3-pyrazolidinyl, 1-piperidinyl, 2-piperidinyl, 3-piperidinyl, 4-piperidinyl, 2,5-piperidinyl, pyranyl, 2-morpholinyl, 3-morpholinyl, oxiranyl, aziridinyl, thiiranyl, azetidinyl, oxetanyl, thietanyl, 1,2-dithietanyl, 1,3-dithietanyl, dihydropyridyl, tetrahydropyridyl, thiomorpholinyl, thioxanyl, piperazinyl, homopiperazinyl, homopiperidinyl, azepanyl, oxepanyl, thiepanyl, 1,4-oxathianyl, 1,4-dioxepanyl, 1,4-oxathiepanyl, 1,4-oxaazepanyl, 1,4-dithiepanyl, 1,4-thiazepanyl and 1,4-diazepane 1,4-dithianyl, 1,4-azathianyl, oxazepinyl, diazepinyl, thiazepinyl, dihydrothienyl, dihydropyranyl, dihydrofuranyl, tetrahydrofuranyl, tetrahydrothienyl, tetrahydropyranyl, tetrahydrothiopyranyl, 1-pyrrolinyl, 2-pyrrolinyl, 3-pyrrolinyl, indolinyl, 2H-pyranyl, 4H-pyranyl, 1,4-dioxanyl, 1,3-dioxolanyl, pyrazolinyl, pyrazolidinyl, dithianyl, dithiolanyl, pyrazolidinylimidazolinyl, pyrimidinonyl, 1,1-dioxothiomorpholinyl, 3-azabicyclo[3.1.0]hexanyl, 3-azabicyclo [4.1.0]heptanyl, azabicyclo[2.2.2]hexanyl. Substituted heterocycles also comprise ring systems substituted with one or more oxo moieties, such as pyrimidinyl N-oxide, morpholinyl-N-oxide, 1-oxo-1-thiomorpholinyl and 1,1-dioxo-1-thiomorpholinyl.

The term "aryl" refers to an aromatic ring in which each atom forming the ring is a carbon atom. Aryl rings can be formed by five, six, seven, eight, nine, or more than nine carbon atoms. Aryl groups can be optionally substituted. Examples of aryl groups comprise, but are not limited to, phenyl, naphthyl, phenanthryl, anthryl, fluorenyl, and indenyl.

The term "heteroaryl" or alternatively "heteroaromatic group" refers to an aromatic group that comprises one or more ring heteroatoms selected from nitrogen, oxygen, and sulfur. The "heteroaromatic group" or "heteroaryl" moiety containing N refers to an aromatic group in which at least one of the backbone atoms of the ring is a nitrogen atom.

Illustrative examples of heteroaryl groups comprise the following moieties:

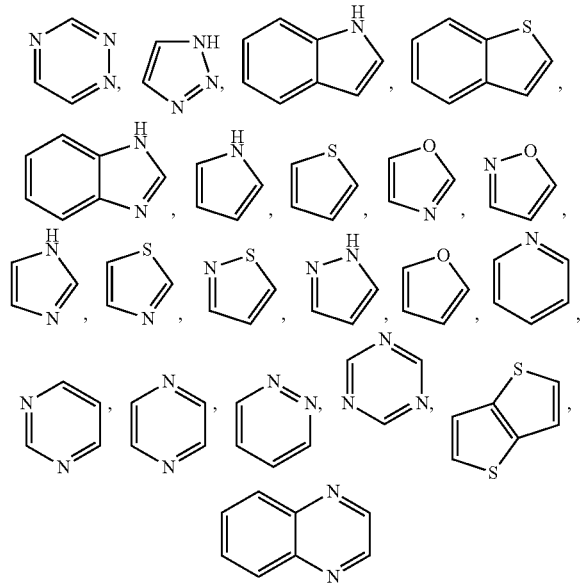

etc. Depending on the structure, heteroaryl groups can be monoradical or diradical (i.e., heteroarylene groups).

Herein, the term "oxo" refers to (=O) or (—O—).

The term "alkoxy" refers to an (alkyl)O— group, wherein the alkyl is as defined herein.

Everywhere in this specification, the substituents of the compounds of the present invention are disclosed in the form of groups or ranges. This specifically means that the present invention comprises each member of such groups and ranges or subcombinations of each individual of the members. For example, the term "$C_{1-6}$ alkyl" specifically means that methyl, ethyl, $C_3$ alkyl, $C_4$ alkyl, $C_5$ alkyl, and $C_6$ alkyl group are separately disclosed.

Herein, the term "compounds of the present invention" (unless otherwise specifically indicated) refers to compounds of formula (I)-(III) and all pure and mixed stereoisomers, geometric isomers, tautomers, solvates, hydrates, prodrugs and isotope-labeled compounds and any pharmaceutically acceptable salts thereof. The solvate of the compound of the present invention refers to a compound or salt thereof combined with a stoichiometric and non-stoichiometric solvent, such as hydrate, ethanolate, methanolate, and the like. Compounds can also exist in one or more crystalline states, i.e., as co-crystals, polymorphs, or as amorphous solids. All such forms are covered by the claims.

The term "pharmaceutically acceptable" means that the substance or composition must be chemically and/or toxicologically compatible with the other ingredients constituting the formulation and/or the mammal to be treated with the compound or composition.

Herein, the term "stereoisomers" refers to compounds having one or more stereocenters and with different chirality, comprising enantiomers and diastereomers.

The compounds of the present invention can be used in the form of salts, such as "pharmaceutically acceptable salts" derived from inorganic or organic acids. These comprise but are not limited to the following salts: acetate, adipate, alginate, citrate, aspartate, benzoate, benzenesulfonate, bisulfate, butyrate, camphorate, camphorsulfonate, digluconate, cyclopentane propionate, lauryl sulfate, ethanesulfonate, glucoheptanoate, glycerophosphate, hemisulfate, heptylate, caproate, fumarate, hydrochloride, hydrobromide, hydroiodide, 2-hydroxyethanesulfonate, lactate, maleate, methanesulfonate, hydrochloride, 2-naphthalenesulfonate, oxalate, pectinate, sulfate, 3-phenylpropionate, picrate, trimethylacetate, propionate, succinate, tartrate, thiocyanate, p-toluenesulfonate and caprate. In addition, basic nitrogen-containing groups can react with the following reagents to undergo quaternization to form quaternary ammonium salts: such as lower alkyl halides, comprising methyl, ethyl, propyl and butyl chlorides, bromides and iodide; such as dialkyl sulfates, comprising dimethyl, diethyl, dibutyl and dipentyl sulfates; such as long-chain halides, comprising decyl, lauryl, myristyl and stearyl chlorides, bromides and iodides; such as aralkyl halides, such as benzyl and phenethyl bromides.

The present invention also comprises isotope-labeled compounds of the present invention, which have the same structure as disclosed above, but one or more atoms in the structure are replaced by atoms having the same number of protons but different numbers of neutrons. Examples of isotopes that bind to the compounds of the present invention comprise isotopes of hydrogen, carbon, nitrogen, oxygen, sulfur, fluorine, chlorine, and iodine, such as $^2H$, $^3H$, $^{13}C$, $^{14}C$, $^{15}N$, $^{18}O$, $^{17}O$, $^{35}S$, $^{18}F$, $^{36}Cl$, and $^{131}I$. The compounds of the present invention, stereoisomers, tautomers or pharmaceutically acceptable salts thereof, and compounds in the above forms containing the above-mentioned isotopes and/or other atomic isotopes are all within the scope of the present invention. Certain isotope-labeled compounds of the present invention, such as those labeled with $^3H$ or $^{14}C$, can be used in drug tissue distribution tests. Therefore, these $^3H$ or $^{14}C$ isotopes are particularly preferred because they can be easily prepared and detected. In addition, some of the compounds of the present invention wherein the atoms are replaced by heavier isotopes such as $^2H$ have certain therapeutic advantages due to their better metabolic stability, such as increased half-life in the body and lower doses. Therefore, in some cases, $^2H$ is also preferred. Isotope-labeled compounds of formula (I)-(III) of the present invention and prodrugs thereof can generally be prepared in the following way: reagents that are labeled with non-isotopes are replaced by reagents that are labeled with readily available isotopes when performing the processes disclosed in the following procedures and/or examples and preparation examples.

Another aspect of the present invention relates to a pharmaceutical composition comprising a therapeutically effective amount of the compound described in general formula (I)-(III), or a pharmaceutically acceptable carrier, diluent or excipient thereof.

The present invention further relates to use of the compounds of general formulas (I)-(III) or a pharmaceutically acceptable salt thereof, or pharmaceutical compositions comprising the compounds of general formulas (I)-(III) in preparing medicaments for preventing and/or treating diseases having ALK2 kinase-mediated pathological features.

Diseases having ALK2 kinase-mediated pathological features are selected from anemia and cancer.

The present invention also relates to a method for treating and/or preventing diseases having ALK2 kinase-mediated pathological features, the method comprises administering to a patient a therapeutically effective amount of a compound of general formulae (I)-(III) or a pharmaceutically acceptable salt thereof, or a pharmaceutical composition comprising the compound of general formulae (I)-(III), wherein the diseases having ALK2 kinase-mediated pathological features are selected from anemia and cancer.

The present invention also relates to a method for treating and/or preventing a disease having ALK2 kinase-mediated pathological features, the method comprises administering to a patient a therapeutically effective amount of a compound of general formulae (I)-(III) or a pharmaceutically acceptable salt thereof, or a pharmaceutical composition comprising the compound of general formulae (I)-(III), wherein the disease having ALK2 kinase-mediated pathological features is selected from anemia, and wherein the anemia is selected from anemia of chronic disease, anemia of chronic inflammation, cancer and progressive fibrotic dysplasia anemia.

The present invention also relates to a method for treating and/or preventing a disease having ALK2 kinase-mediated pathological features, the method comprises administering to a patient a therapeutically effective amount of a compound of general formulae (I)-(III) or a pharmaceutically acceptable salt thereof, or a pharmaceutical composition comprising the compound of general formulae (I)-(III), wherein the disease having ALK2 kinase-mediated pathological features is selected from cancer, wherein the cancer is selected from prostate cancer, breast cancer, cervical cancer, endometrial cancer, colon cancer, stomach cancer, lung cancer, liver cancer, bladder cancer, pancreatic cancer, rectal cancer, skin cancer (comprising melanoma and basal cell carcinoma), oral cancer, bone cancer, ovarian cancer, brain cancer, head and neck cancer, mesothelial endometrial cancer, leukemia, lymphoma, esophageal cancer, kidney cancer, thyroid cancer, myeloma, choriocarcinoma, testicular cancer, glioma, glioblastoma, fallopian tube tumor, myelofibrosis, polycythaemia vera and essential thrombocythemia.

A Method for Preparing a Compound or Intermediate

Specific examples are listed below in order to describe the present invention. However, it should be understood that the present invention is not limited to these examples, and the following examples only provide methods for practicing the present invention, and do not limit the scope of the present invention in any way.

The compounds provided by the present invention can be prepared by standard synthesis method known in the art. This specification provides general methods for preparing the compounds of the present invention. The starting materials are usually commercially available, for example, purchased from Alfa Aesar®, Sigma-Aldrich®, TCI, Chengdu Best Reagent, Chengdu Huana Chemical Preparation Co., Ltd., Chengdu Kelon Chemical Reagent Factory, etc., or the starting materials are prepared by methods well-known to those skilled in the art.

The following reaction methods and synthesis steps provide possible ways to synthesize the compounds of the present invention and key intermediates. Please refer to the following examples for a more detailed description of individual reaction steps. Those skilled in the art should understand that the compounds of the present invention can also be obtained through other synthesis routes. Although specific starting materials and reagents are used in the following reaction schemes, these starting materials and reagents can be replaced by other similar starting materials or reagents to provide various derivatives. In addition, under the guidance of this specification, many compounds prepared by the following methods can be further modified by conventional chemical methods well known to those skilled in the art.

The following examples and preparations are used to further explain and list the compounds of the present invention and the corresponding preparation methods. It should be understood that although typical or preferred reaction conditions (such as reaction temperature, time, molar ratio of reactants, reaction solvent and pressure, etc.) are given in the specific examples, those skilled in the art can also use other reaction conditions. The optimal reaction conditions can vary with the specific reaction substrate or solvent used, but the conditions can be determined by those skilled in the art through routine optimization.

The starting materials, intermediates, and example compounds can be separated and purified by conventional techniques such as precipitation, filtration, crystallization, evaporation, distillation, and chromatography (such as column chromatography, TLC separation and purification, etc.).

Unless otherwise specified, the commercial solvents and reagents used in the experiment can be used directly without further purification or treatment after being purchased. When referring to other examples or synthesis methods, the reaction conditions (reaction temperature, reaction solvent, molar ratio of reactants or/and reaction duration) can be different. Generally speaking, the progress of the reaction can be monitored by TLC, and an appropriate time can be selected accordingly to terminate the reaction and carry out post-treatment. The purification conditions of the compound may also change. Generally speaking, an appropriate column chromatography eluent is selected according to the Rf value of TLC, or the corresponding compound is separated and purified by preparative TLC.

The compound of formula (I) of the present invention can be prepared according to the following scheme 1. Intermediate A reacts with intermediate B to produce compound of formula (I) under acidic (trifluoroacetic acid, formic acid, acetic acid, oxalic acid, dilute hydrochloric acid, etc.) or basic (such as triethylamine, N,N-diisopropylethylamine, pyridine, 4-dimethylaminopyridine, N-methylmorpholine, etc.) condition, in a suitable solvent (n-butanol, methanol, ethanol, dichloromethane, tetrahydrofuran, dioxane, dimethylformamide, 1-methyl-2-pyrrolidone, etc.), at a suitable temperature. It should be understood that these reaction conditions are not limitative, and the method described can be used to prepare the compound of formula (I) by reasonably changing the reaction conditions, wherein $R_1$, $R_2$, $R_3$, $R_4$, $R_5$, $R_6$, m, X, Y and Z have the definitions as described in the present invention, and L is a leaving group.

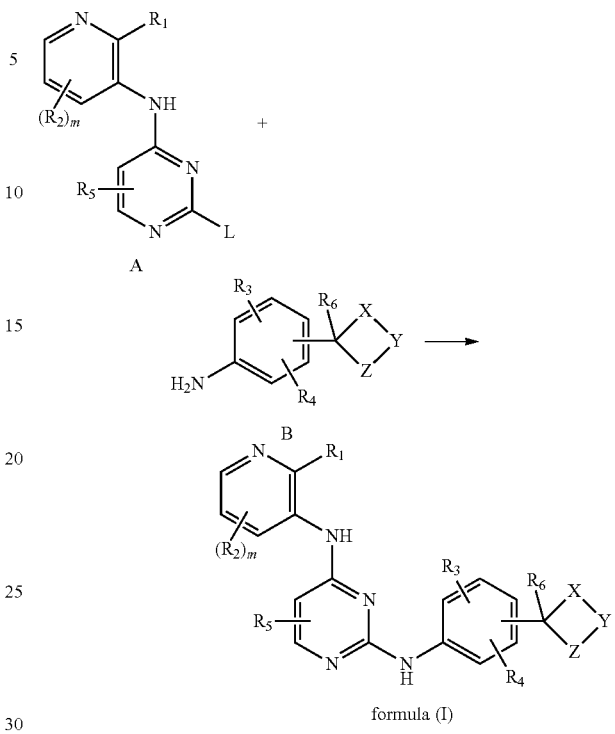

Scheme 1 formula (I)

The following examples are intended to illustrate specific embodiments of the invention, and are by no means intended to limit the scope of the specification or claims of the invention. Those skilled in the art will understand that the starting materials can be different and additional steps can be used to produce the compounds covered by the present invention, as demonstrated in the following examples. The following examples are for illustrative purposes only, and are neither intended nor should be construed as limiting the invention in any way. Those skilled in the art will understand that changes and modifications can be made without departing from the spirit or scope of the present invention.

EXAMPLE 1

$N^4$-(2,2'-bipyridin-3-yl)-$N^2$-(3-methoxy-4-(tetrahydro-2H-pyran-4-yl)phenyl)pyrimidine-2,4-diamine (compound 1)

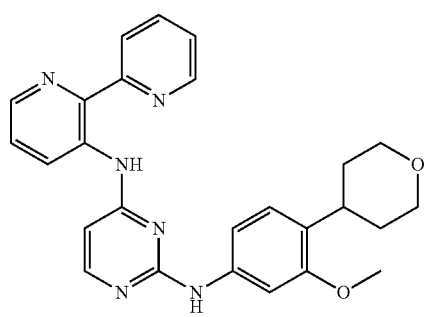

1

17

Preparation of N⁴-(2,2'-bipyridin-3-yl)-N²-(3-methoxy-4-(tetrahydro-2H-pyran-4-yl)phenyl)pyrimidine-2,4-diamine (compound 1)

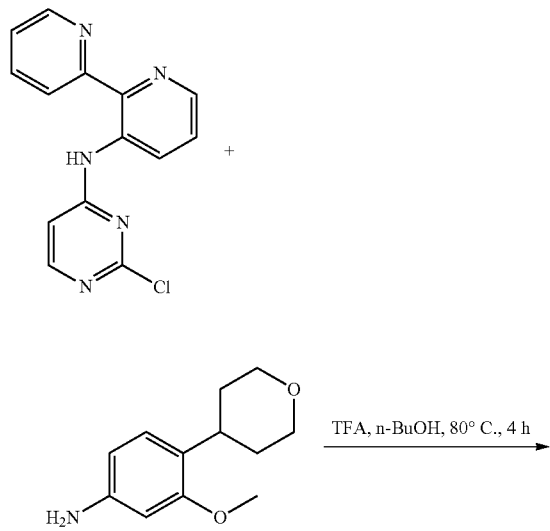

In a round-bottom flask, N-(2-chloropyrimidin-4-yl)-2,2'-bipyridine-3-amine (100 mg, 0.35 mmol) (the preparation method was referred to WO2014151871 A2), 3-methoxy-4-(tetrahydro-2H-pyran-4-yl)aniline (110 mg, 0.53 mmol), TFA (157 μL, 2.11 mmol) and 5 mL n-BuOH were added sequentially, reacted at 85° C. for 4 hours under argon gas protection. After the reaction was completed, saturated sodium bicarbonate and DCM (20 mL×3) were added for extraction, the organic layer was dried over anhydrous sodium sulfate, the solvent was removed, and the crude product was purified by column chromatography (EA:PE=1:1) to obtain compound 1 (120 mg, pale yellow solid, yield: 75.5%). ¹H NMR (DMSO-d₆, 400 MHz, ppm): δ=12.86 (s, 1H), 9.25-9.20 (m, 2H), 8.78-8.76 (m, 1H), 8.58-8.55 (d, J=8.2 Hz, 1H), 8.36-8.34 (dd, J=4.3, 1.3 Hz, 1H), 8.14-8.12 (d, J=5.7 Hz, 1H), 8.07-8.02 (td, J=8.0, 1.7 Hz, 1H), 7.54-7.50 (m, 1H), 7.41-7.31 (m, 3H), 7.09-7.06 (d, J=8.2 Hz, 1H), 6.47-6.44 (d, J=5.7 Hz, 1H), 3.95-3.92 (m, 2H), 3.73 (s, 3H), 3.44-3.39 (m, 2H), 3.09-3.01 (m, 1H), 1.72-1.62 (m, 4H). ¹³C NMR (DMSO-d₆, 100 MHz, ppm): δ=159.9, 159.5, 157.4, 156.8, 156.4, 146.9, 141.6, 139.6, 138.8, 138.0, 136.9, 128.4, 126.6, 126.0, 124.2, 123.5, 122.8, 111.6, 102.9, 100.2, 67.7, 55.2, 33.6, 32.5. ESI-MS m/z: 455.3 [M+H]⁺.

18

EXAMPLE 2

N⁴-(2,2'-bipyridin-3-yl)-N²-3-(methoxy-4-(1-methylpiperidin-4-yl)phenyl)pyrimidine-2,4-diamine (compound 2)

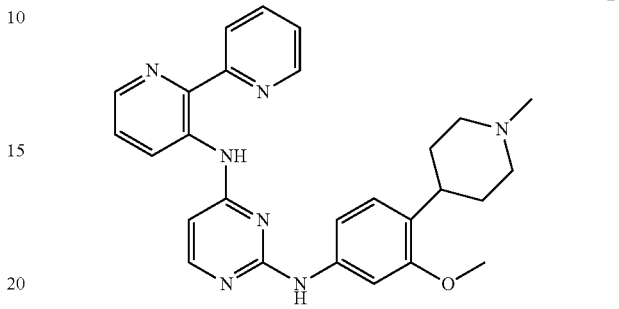

Preparation of N⁴-(2,2'-bipyridin-3-yl)-N²-3-(methoxy-4-(1-methylpiperidin-4-yl)phenyl)pyrimidine-2,4-diamine (compound 2)

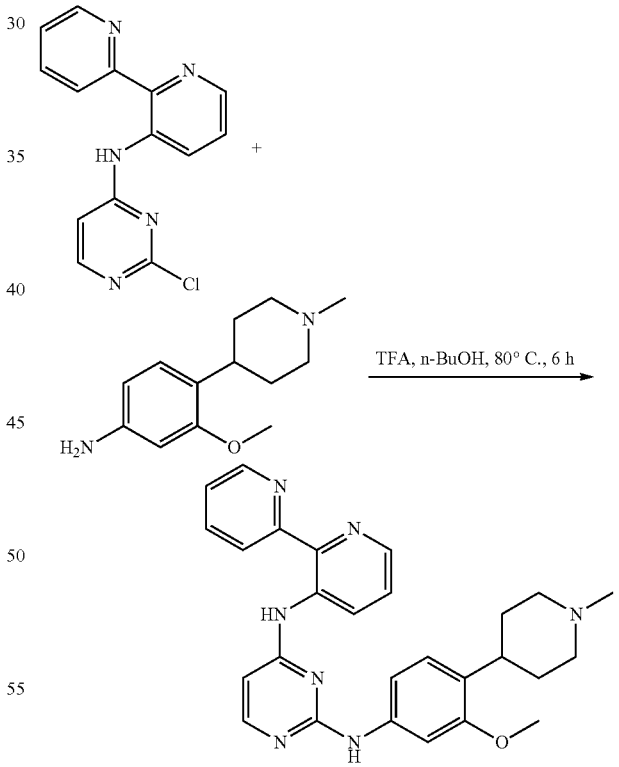

In a round-bottom flask, N-(2-chloropyrimidin-4-yl)-2,2'-bipyridin-3-amine (100 mg, 0.35 mmol), 3-methoxy-4-(1-methylpiperidin-4-yl)aniline (116 mg, 0.53 mmol), TFA (157 μL, 2.11 mmol) and 5 mL n-BuOH were added sequentially, reacted at 85° C. for 4 hours under argon gas protection. After the reaction was completed, saturated sodium bicarbonate and DCM (20 mL×3) were added for extraction, the organic layer was dried over anhydrous sodium sulfate, the solvent was removed, and the crude product was purified by column chromatography (DCM: MeOH=10:1) to obtain compound 2 (96 mg, pale yellow solid, yield: 58.2%). $^1$H NMR (DMSO-$d_6$, 400 MHz, ppm): δ=12.87 (s, 1H), 9.26-9.22 (m, 2H), 8.80-8.78 (m, 1H), 8.60-8.57 (d, J=8.2 Hz, 1H), 8.37-8.35 (dd, J=4.4, 1.2 Hz, 1H), 8.15-8.13 (d, J=5.7 Hz, 1H), 8.09-8.03 (td, J=7.8, 1.7 Hz, 1H), 7.56-7.52 (m, 1H), 7.42-7.31 (m, 3H), 7.08-7.05 (d, J=8.3 Hz, 1H), 6.48-6.46 (d, J=5.7 Hz, 1H), 3.73 (s, 3H), 2.98-2.95 (m, 2H), 2.85-2.77 (m, 1H), 2.30 (s, 3H), 2.15 (brs, 2H), 1.71-1.66 (m, 4H). $^{13}$C NMR (CDCl$_3$, 100 MHz, ppm): δ=160.5, 159.95, 158.4, 157.1, 156.6, 146.3, 141.7, 139.7, 138.7, 137.4, 137.3, 128.8, 128.2, 126.6, 124.0, 123.5, 122.9, 112.8, 103.8, 100.6, 56.4, 55.4, 46.1, 34.0, 31.7. ESI-MS m/z: 468.3 [M+H]$^+$.

EXAMPLE 3

N$^4$-(2,2'-bipyridin-3-yl)-5-chloro-N$^2$-(3-methoxy-4-(1-methylpiperidin-4-yl)phenyl)pyrimidine-2,4-diamine (compound 3)

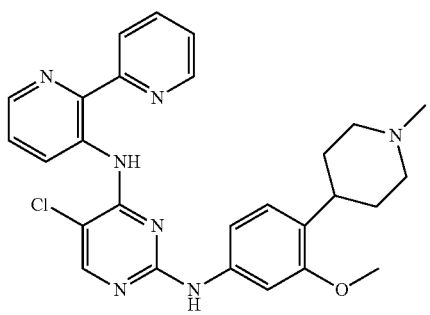

Compound 3 was obtained by referring to the preparation scheme of scheme 1, ESI-MS: 502.7[M+H]$^+$.

EXAMPLE 4

N$^4$-(2,2'-bipyridin-3-yl)-5-methoxy-N$^2$-(3-methoxy-4-(tetrahydro-2H-pyran-4-yl) phenyl)pyrimidine-2,4-diamine (compound 4)

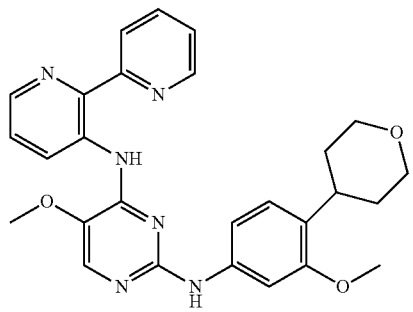

Compound 4 was obtained by referring to the preparation scheme of scheme 1, ESI-MS: 485.5[M+H]$^+$.

EXAMPLE 5

N$^2$-(3-methoxy-4-(1-methylpiperidin-4-yl)phenyl)-N$^4$-(6-methyl-2,2'-bipyridin-3-yl)pyrimidine-2,4-diamine (compound 5)

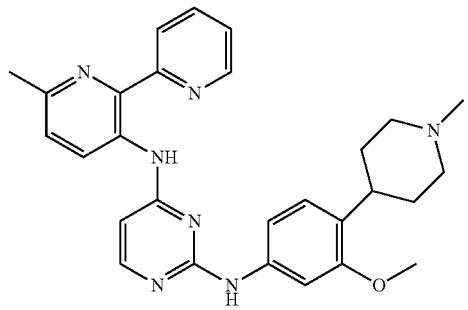

Compound 5 was obtained by referring to the preparation scheme of scheme 1, ESI-MS: 482.2[M+H]$^+$.

EXAMPLE 6

1-(4-(4-(4-(2,2'-Bipyridin-3-ylamino)pyrimidin-2-ylamino)-2-methoxyphenyl)piperidin-1-yl)ethan-1-one (compound 6)

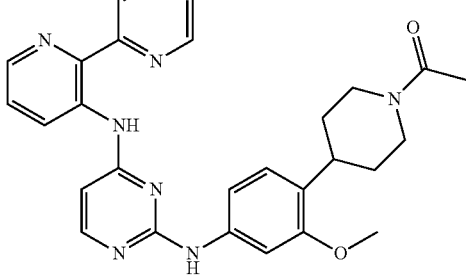

Compound 6 was obtained by referring to the preparation scheme of scheme 1, ESI-MS: 496.3[M+H]$^+$.

Biological Test

1. Inhibitory Activity Test of the Compounds on ALK2

ALK2 Kinase Enzyme System kit from Promega was used for the test. Reagents for kinase test was prepared first, the reagents comprising: ①4×Kinase buffer 250 μL (containing 200 μM DTT); ②5×Inhibitor mother liquor, i.e., the test compound was prepared into 10 mM mother liquor with DMSO, and the test compound was diluted into 5 mM (20 μL of 10 mM test compound mother liquor+20 μL of DMSO dissolved) with DMSO; ③1×Kinase buffer (containing 1% DMSO) 200 μL; ④1×Kinase buffer 40 μL; ⑤Kinase solution 115 μL; ⑥Substrate Mix (containing 65 μM ATP) 120 μL. The inhibitor working solution was then prepared, i.e., the test compound was prepared into 5 mM mother liquor with DMSO, 1 μL of 5 mM mother liquor was taken and was diluted into the concentration of 50000 nM by adding 99 μL 1×Kinase buffer; 20 μL of the solution of this concentration was taken, and 80 μL of 1×Kinase buffer (containing 1%

DMSO) was added thereto to obtain the concentration of 10000 nM, 5 times dilution was carried out in this way, and a total of 6 concentration gradients were provided. 1 μL of the compound at each concentration was taken and added to a 384-well plate, and then 2 μL Kinase solution (160 mM Tris, 7.5; 80 mM $MgCl_2$; 0.4 mg/ml BSA; 200 μM DTT; ALK2 kinase) was added to each well, and the plate was centrifuged at 1000 rpm for 20 seconds at room temperature, incubated for 30 minutes at 25° C.; then 2 μL of a mixture containing ATP and kinase substrate was added to each well, the plate was centrifuged at 1000 rpm for 20 seconds at room temperature, and incubated at 25° C. for 120 minutes. Then 5 μL of ADP-Glo™ reagent was added to each well, and the plate was incubated at 25° C. for 40 minutes; then 10 μL of Kinase Detection Reagent was added to each well, the plate was incubated at 25° C. for 30 minutes and then was tested; a microplate reader was used to record the chemiluminescence value, the curve was fitted with Origin 7.5, the $IC_{50}$ (nM) value of the test substance on the ALK2 kinase activity was calculated.

TABLE 1

Test results of the inhibitory activity of the compounds on ALK2.

| Compound no. | $IC_{50}$ (nM) values of the inhibitory activities on ALK2 |
|---|---|
| 1 | B |
| 2 | A |
| 4 | B |
| 5 | A |
| Compound I* | C |

*Compound I is compound 12 prepared in accordance with WO2014151871 A2.

In Table 1, the $IC_{50}$ value ranges represented by A, B, and C are: A≤150 nM, 150 nM<B<500 nM, and C≥500 nM respectively. The test results show that the compounds of the examples of the present invention have a significant inhibitory effect on ALK2 kinase.

2. Inhibition Test of Compounds on Hepcidin Expression in HepG2 Cells

HepG2 cells (ATCC HB-8065) in the exponential growth phase were digested with trypsin-EDTA, inoculated into 96-well plates at 5000 cells/well, and cultured in MEM (10% FBS) medium at 37° C. under 5% $CO_2$ conditions for 24 hours, the test compound dissolved in DMSO and diluted in the medium and at a gradient concentration was added to each culture well. The preparation method of the test compound is: a compound mother liquor at a concentration of 10 mM was prepared, and then the compound was diluted in a gradient. The highest concentration of the compound for test was 10 μM, and a total of 8 gradients were obtained by 5-fold dilution. The diluted compound was added to a 96-well plate covered with cells, 50 μL per well. After the compound was added, the plate was placed in an incubator stored at 37° C. and 5% $CO_2$, and incubated for another 48 hours. After the incubation was completed, the 96-well plate was centrifuged at 1000 rpm for 5 minutes at room temperature, the supernatant was taken, ELISA sample loading and detecting were completed within 30 minutes. Hepcidin ELISA kit (Human Hepcidin Quantikine ELISA Kit, R&D systems, Cat #DHP250) was used to quantitatively detect hepcidin protein. The prepared detecting reagents comprises: Calibrator Diluent RD5-26 80 mL, Wash Buffer 500 mL, Substrate Solution 30 mL (color developer A 15 mL and B 15 mL are mixed in equal volume then are used in the dark within 15 minutes, the final volume of each well is 200 μL), human hepcidin standard: the final concentrations of recombinant human hepcidin standards are: 1000, 500, 250, 125, 62.5, 31.3, 15.6, 0 (pg/mL). 50 μL Assay Diluent RD1-21 was added to each well. 50 μL of standards, controls or samples were added to each well, the wells were covered with a sealing strip, and incubated at room temperature for 2 hours. The liquid in the well was sucked out, and 400 μL Wash Buffer was added to the well to wash the plate, the plate was washed 4 times in total, the remaining liquid was sucked up at each time before performing the next wash. 200 μL human hepcidin binding solution was added to each well, a new sealing strip was sealed, the plate was incubated at room temperature for 2 hours. The liquid in the well was sucked out, and 400 μL Wash Buffer was added to wash the plate, the plate was washed 4 times in total, the remaining liquid was sucked up at each time before performing the next wash. 200 μL of Substrate Solution was added to each well, the wells were kept in dark place, and incubated at room temperature for 30 minutes. 50 μL Stop Solution was added to each well, and the color in the well should change from blue to yellow. If the color in the well was green or the color changes were inconsistent, the reaction plate would be tapped lightly to allow the solution to be mixed well. After washing and color development, the absorbance value was determined with a microplate reader at 450 nm, and the concentration of hepcidin protein in the test sample was calculated according to the quasi-curve of human hepcidin protein determination, and the curve was fitted with Origin 7.5 software, the $IC_{50}$ (nM) value on the inhibition of producing hepcidin preotein of HepG2 cells by the test compound was calculated.

TABLE 2

Test results of the inhibitory activity of the compounds on hepcidin in HepG2 cells.

| Compound no. | IC50 (nM) values of the inhibitory activities on hepcidin in HepG2 cells |
|---|---|
| 2 | 14 |
| 5 | 30 |
| Compound I* | 532 |

*Compound I is compound 12 prepared in accordance with WO2014151871 A2.

The test results show that the compounds of the examples of the present invention have significant inhibitory effects on the expression of hepcidin in HepG2 cells.

The invention claimed is:

1. A compound represented by formula (III), or pharmaceutically acceptable salts, hydrates, or stereoisomers thereof, wherein formula (III) is

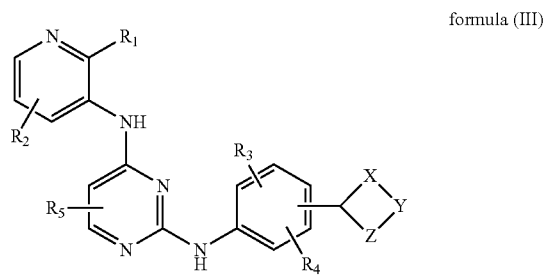

formula (III)

wherein,

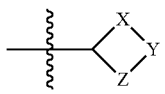

is selected from the group consisting of

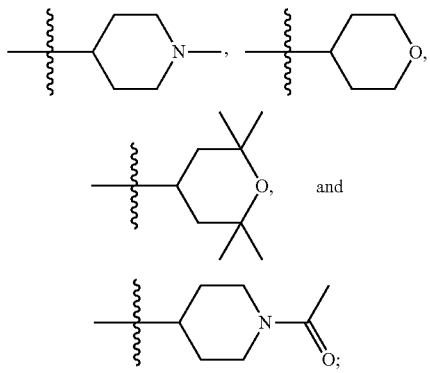

R₁ is

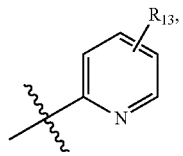

wherein R₁₃ is selected from the group consisting of —H and -methyl;

R₂ is selected from the group consisting of —H and methyl;

R₃ and R₄ are each independently selected from the group consisting of —H, halogen, methyl, and methoxy; and R₅ is selected from the group consisting of —H, halogen, methyl, and methoxy.

2. The compound according to claim 1, or pharmaceutically acceptable salts, hydrates, or stereoisomers thereof, the compound is selected from the group consisting of:

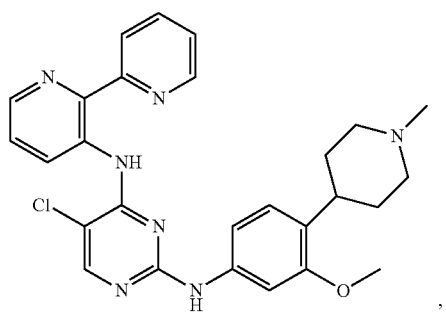

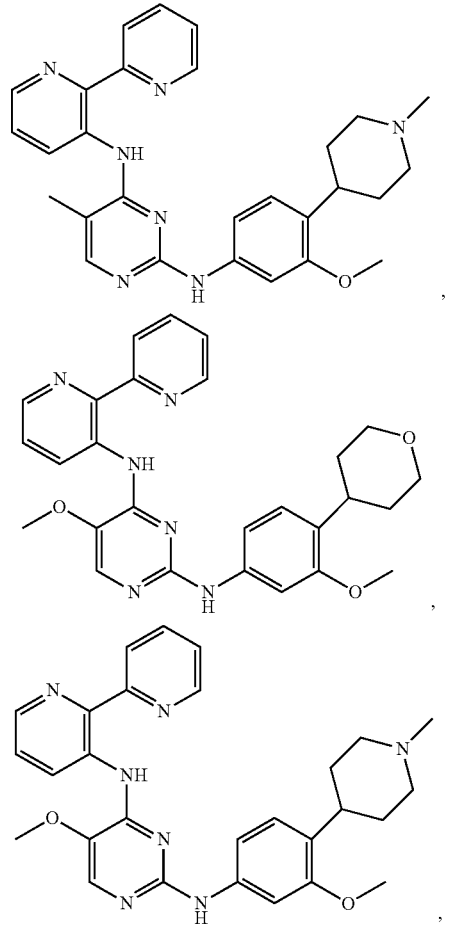

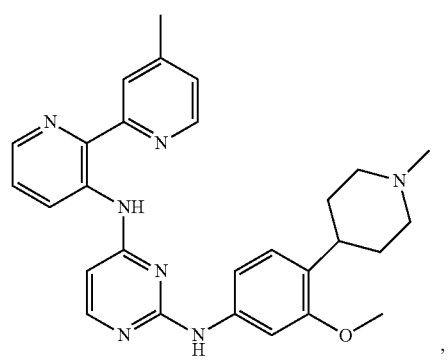

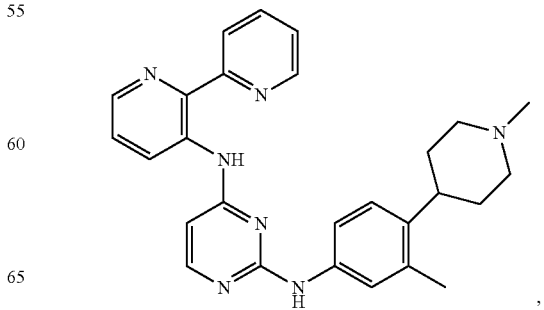

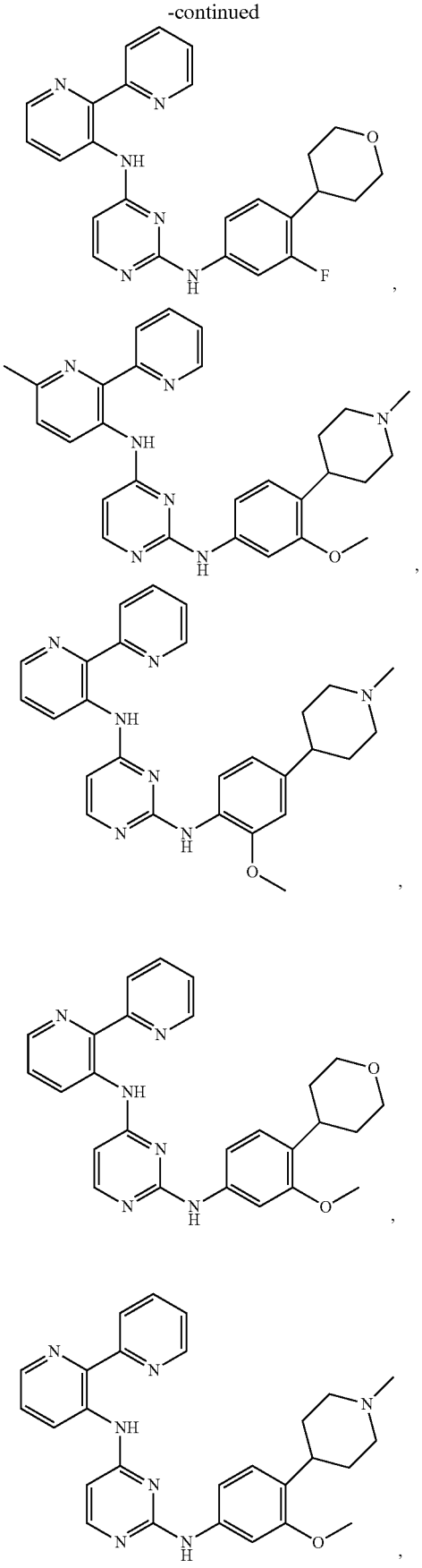

,

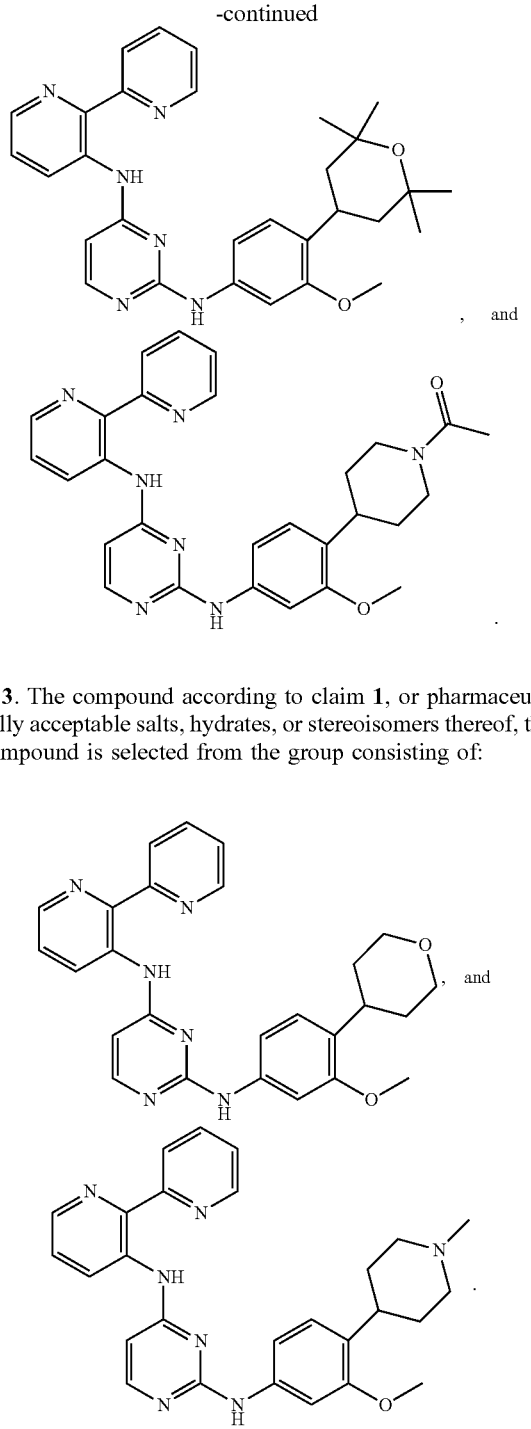

, and

3. The compound according to claim 1, or pharmaceutically acceptable salts, hydrates, or stereoisomers thereof, the compound is selected from the group consisting of:

4. A pharmaceutical composition comprising a therapeutically effective amount of the compound according to claim 1, and a pharmaceutically acceptable carrier, diluent, or excipient thereof.

5. A method for treating a disease having ALK2 kinase-mediated pathological features, wherein the method comprises administering to a patient a therapeutically effective amount of the compound according to claim 1 or a pharmaceutically acceptable salt thereof, wherein the disease having ALK2 kinase-mediated pathological features is selected from anemia and cancer.

6. The method for treating a disease having ALK2 kinase-mediated pathological features according to claim 5, wherein the anemia is selected from the group consisting of anemia of chronic disease, anemia of chronic inflammation, and progressive fibrotic dysplasia anemia.

7. The method for treating a disease having ALK2 kinase-mediated pathological features according to claim 5, wherein the cancer is selected from the group consisting of prostate cancer, breast cancer, cervical cancer, endometrial cancer, colon cancer, stomach cancer, lung cancer, liver cancer, bladder cancer, pancreatic cancer, rectal cancer, skin cancer, melanoma, basal cell carcinoma, oral cancer, bone cancer, ovarian cancer, brain cancer, head and neck cancer, mesothelial endometrial cancer, leukemia, lymphoma, esophageal cancer, kidney cancer, thyroid cancer, myeloma, choriocarcinoma, testicular cancer, glioma, glioblastoma, fallopian tube tumor, myelofibrosis, polycythaemia vera and essential thrombocythemia.

* * * * *